United States Patent [19]

Helms

[11] 4,378,236
[45] Mar. 29, 1983

[54] METHOD AND APPARATUS FOR RECOVERING HEAT AND SMOKE FROM AN AIRSTREAM

[76] Inventor: Olin L. Helms, Box 770, Concord, N.C. 28025

[21] Appl. No.: 817,163

[22] Filed: Jul. 20, 1977

[51] Int. Cl.³ .............................................. B01D 47/00
[52] U.S. Cl. .................................... 55/89; 55/90; 55/122; 55/257 PV; 55/228; 261/118
[58] Field of Search ................. 55/80, 84, 85, 89, 220, 55/90, 222, 122, 227-229, 257 PV, 440; 261/117-118; 34/158, 26, 28, 79

[56] References Cited

U.S. PATENT DOCUMENTS 3,733,788 5/1973 Crowley ............................ 55/228
3,967,940 7/1976 Hirano et al. .................... 55/138
4,028,072 6/1977 Braun et al. ....................... 55/43

FOREIGN PATENT DOCUMENTS 2511181 9/1976 Fed. Rep. of Germany .......... 55/90

OTHER PUBLICATIONS

Tube-tex Energy Recovery Air to Water System Tubular Textile Machinery, Woodside, New York, pp. 1-4, dated 5/10/77.

Primary Examiner—Bernard Nozick
Attorney, Agent, or Firm—Bell, Seltzer, Park & Gibson

[57] ABSTRACT

A method and apparatus for recovering heat and volatilized fluid contaminates or smoke from an airstream, and which includes continuously spraying a fluid, such as lightweight oil, into the airstream, collecting and cooling the sprayed fluid and any condensed contaminates, and recirculating the collected and cooled fluid and condensed contaminates to make-up the fluid which is sprayed into the airstream. Heat is recovered from the airstream as part of the step of cooling the fluid and condensed contaminates, and a substantial portion of any remaining contaminates may be removed in a downstream precipitator.

18 Claims, 5 Drawing Figures

METHOD AND APPARATUS FOR RECOVERING HEAT AND SMOKE FROM AN AIRSTREAM

The present invention relates to a method and apparatus for recovering heat and removing volatilized fluid contaminants from a heated airstream, such as the exhaust from a manufacturing operation which involves heat processing.

The recent enactment and enforcement of strict environmental codes, together with the increasing cost of energy, have focused attention on numerous manufacturing operations which contaminate the atmosphere and utilize energy inefficiently. As one particular example, textile processing plants commonly utilize tenter frame curing ovens wherein the fabric is heated to about 450°–500° F. to dry and heat set the fabric. A substantial portion of the heat energy used in the oven is commonly exhausted to the atmosphere and lost, and the temperature in the oven causes any oils, waxes, or finishes in the fabric to volatilize, and these volatilized contaminants appear as a blue-grey smoke in the exhaust.

In an attempt to recover the heat and abate the smoke from the exhaust of such manufacturing operations, it has been proposed to initially cool the exhaust by passing it through a heat exchanger, which causes the smoke to at least partially condense. The airstream with the condensed smoke is then passed through a smoke abatement device, which usually comprises an electrostatic precipitator.

Two basic types of heat exchangers are currently employed in the heat recovery processes as described above, namely, an air to water exchanger in which the heat is transferred to water, and an air to air exchanger in which the heat is transferred into a second airstream by some heat exchange medium. In both instances, finned tubular coils are positioned in the hot exhaust, and the water or other heat exchange medium is pumped through the coils to absorb heat from the exhaust. The use of such finned coils presents a significant problem however, in that the volatilized contaminants tend to condense and build up on the relatively cool coils. This build up of material decreases the heat transfer through the coils, and periodic maintenance is required to remove the material. As will be apparent, such maintenance is a time consuming and laborious operation, and in many instances the build up of material is so heavy as to require the complete removal and replacement of the coils.

It has also been proposed to cool hot exhaust gases by spraying water into the exhaust. While such an operation is often satisfactory where relatively low temperatures are involved, at higher temperatures, i.e., temperatures near or above the boiling temperature of water, the sprayed water is rapidly evaporated and converted into steam. The steam is then carried into the atmosphere with the exhaust, and thus there is no opportunity to recover any of the heat energy from the exhaust.

It is accordingly an object of the present invention to provide a method and apparatus for efficiently cooling and recovering heat from an airstream, such as the exhaust from a manufacturing operation and which is at a temperature near or above the boiling temperature of water.

It is also an object of the present invention to provide a method and apparatus for efficiently recovering heat and volatilized fluid contaminants from an airstream which is at an elevated temperature.

It is a further object of the present invention to provide a method and apparatus for recovering volatilized fluid contaminants from the exhaust of a manufacturing operation, and such that the contaminants may be reclaimed and re-used.

These and other objects and advantages of the present invention are achieved in the embodiment illustrated herein by the provision of a method and apparatus which includes contacting an airstream such as a hot exhaust from a tenter frame oven, with an atomized fluid which has a boiling temperature substantially above that of water and which is at a temperature substantially below that of the airstream, and such that the fluid absorbs heat from the airstream. The fluid thus cools the airstream, and a substantial proportion of any volatilized contaminants in the airstream are condensed and collected with the atomized fluid, thereby resulting in the recovery of a substantial proportion of the contaminants.

In the preferred embodiment, the collected fluid and condensed contaminants are cooled to recover the heat absorbed from the airstream, and then sprayed into the airstream to make up the fluid which is brought into contact with the airstream. The heat may be used, for example, to preheat the air entering the tenter frame and thereby reduce the amount of required fuel, or it may be used for some other separate purpose such as heating the building air. Also, precipitator means, such as a plurality of parallel, spaced apart herringbone shaped plates, or an electrostatic precipitator, may be positioned downstream of the spraying operation to remove and recover a substantial proportion of any remaining contaminants in the airstream.

Some of the objects having been stated, other objects will appear as the description proceeds, when taken in connection with the accompanying drawings in which FIG. 1 is a schematic view of a tenter frame curing oven which incorporates an apparatus for recovering heat and volatilized fluid contaminants from the exhaust in accordance with the present invention;

Figure 1:
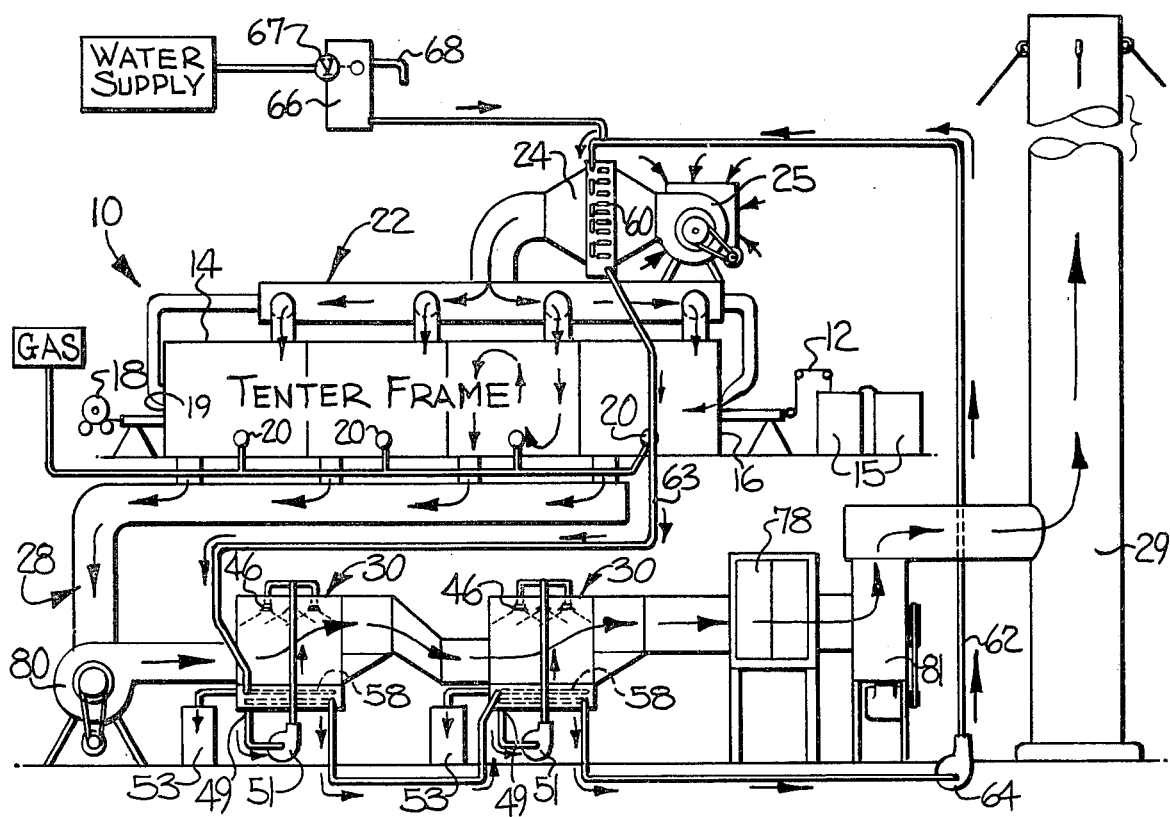

Referring more specifically to the drawings, FIG. 1 schematically illustrates a tenter frame curing oven which is generally indicated at 10 and which embodies the features of the present invention. While the invention is described herein with particular reference to a tenter frame, it will be understood that the invention is also adapted for use in association with many other manufacturing operations where it is desired to recover heat and abate the smoke in exhaust gases. For example, the heat recovery and smoke abatement aspects of the present invention may be utilized in association with plastic processing, rubber curing, and asphalt processing ovens.

The tenter frame itself is generally conventional, and is designed to dry and stretch a fabric 12 to its finished length. More particularly, the tenter frame comprises a relatively large elongate oven enclosure 14 having two diverging endless chains (not shown) extending through the length thereof. The fabric 12 which is loosely folded in the storage boxes 15, enters the enclosure 14 through a slot at one end 16 thereof, and is held between the two chains and conveyed through the drying compartments to a take-up roller 18 at the opposite end 19. The compartments are heated by the gas burners 20, and the temperature within the compartments typically ranges between about 450°–500° F.

The tenter frame also comprises an inlet duct system 22 for delivering air into each of the drying compartments, as well as to the slots at the entering end 16 and opposite end 19 of the enclosure. As further described below, the inlet duct system 22 includes a heat exchanger 24, and a blower 25 for delivering the air thereinto. An exhaust duct system 28 is operatively connected to the enclosure 14, and serves to carry the heated exhaust gases to the smokestack 29. In this regard, the temperature of the exhaust gases from a tenter frame is usually at least about 200° F., and typically is between about 300°–325° F.

In accordance with the present invention, two apparatus 30 for removing and recovering the heat and volatilized fluid contaminants from the exhaust are incorporated in series in the exhaust duct system 28. In this regard, it is recognized in the textile industry that the oils, waxes, or finishes remaining in the fabric will volatilize in the tenter frame, and will appear as a highly visible blue-grey smoke in the exhaust. Each apparatus 30 of the present invention is adapted to not only recover and permit re-use of a significant portion of the heat energy in the exhaust, but also to remove the volatilized contaminants such that the exhaust passing into the atmosphere will meet pollution control standards. Further, the contaminants removed from the fabric in a tenter frame are in the form of a lightweight oil, which can be reclaimed and re-used, such as burning as a fuel, to thereby further contribute to the efficiency of the operation.

Figure 2:
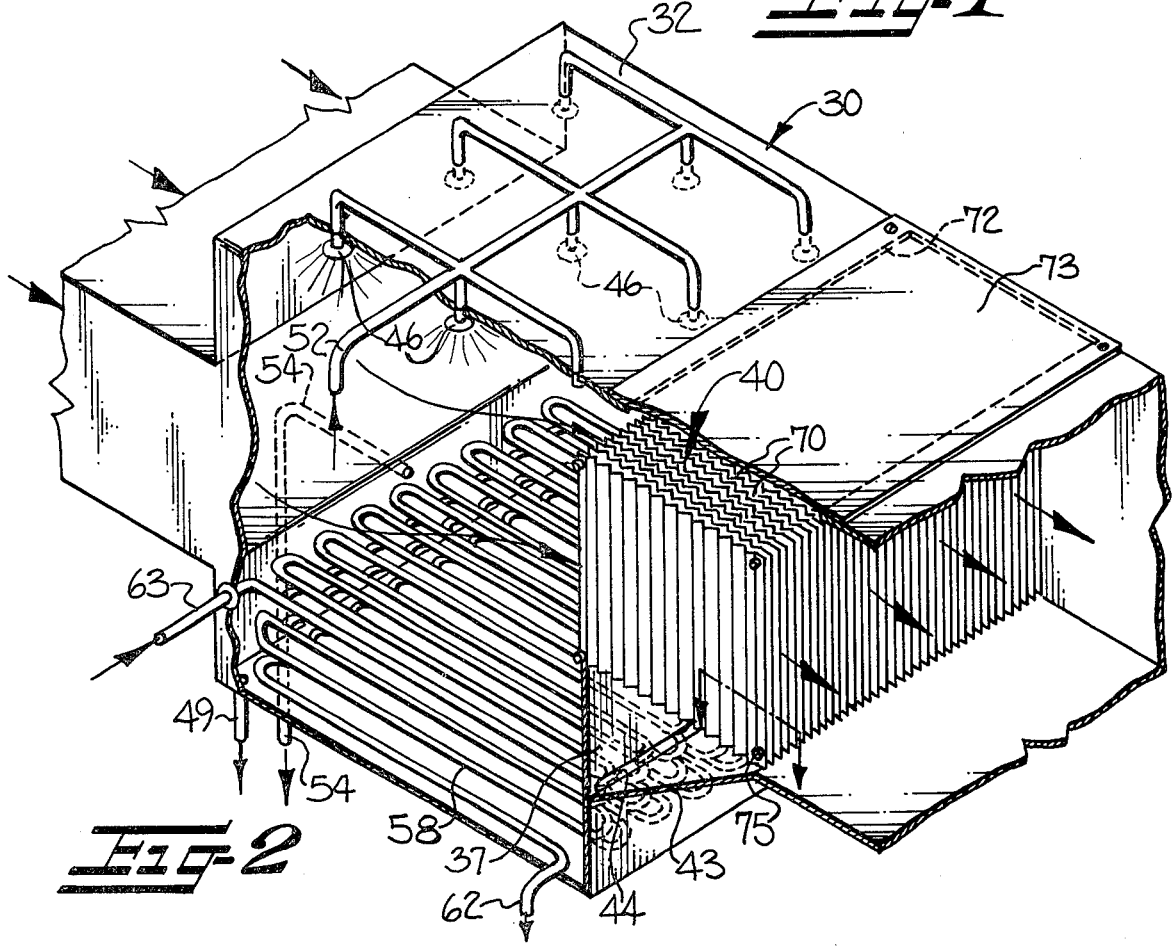
FIG. 2 is a perspective view, partly broken away, illustrating the apparatus for recovering heat and volatilized fluid contaminants as illustrated in FIG. 1.
Figure 3:
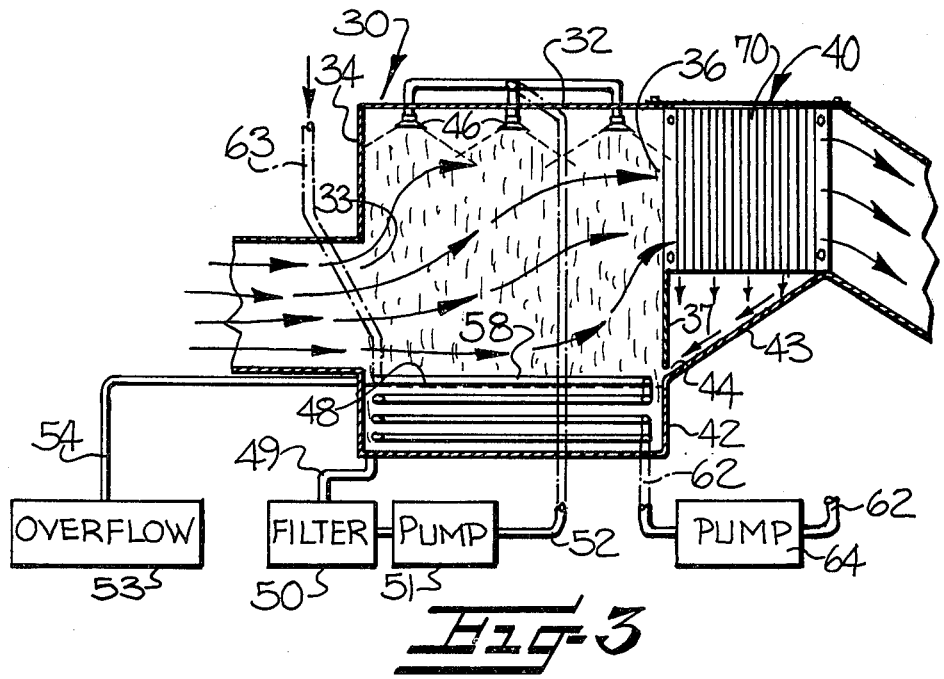
FIG. 3 is a sectional elevation view of the apparatus shown in FIG. 2.

As best seen in FIGS. 2 and 3, each apparatus 30 comprises a generally box-like housing 32 having an air inlet 33 in one side wall 34, and an air outlet 36 in the opposite side wall 37 to define an air passageway therethrough. In addition, a precipitator 40 as hereinafter further described, is mounted immediately downstream of the outlet 36, and much that the air passing through the housing subsequently passes through the precipitator 40. The lower portion of the housing 32 defines a fluid collection tray 42, and an inclined wall 43 underlies the precipitator 40 to convey the fluid collected in the precipitator 40 into the tray 42 via the slot 44 in the side wall 37 and in a manner further described below. Also, it will be noted that the outlet 36 is positioned somewhat above the inlet 33, such that the direction of the air passing through the housing includes a vertically upward component, note FIG. 3.

Fluid inlet means, in the form of nine separate spray nozzles 46, are positioned along the upper wall of the housing 32 and above the tray 42, such that the air passageway through the housing extends between the nozzles 46 and the tray 42. A fluid 48, such as lightweight oil having a boiling temperature of at least about 400° F., or a substance having properties similar to such a lightweight oil, substantially fills the tray 42. The fluid 48 is circulated from the tray and into the housing through the nozzles 46, and for this purpose, there is provided an outlet pipe 49 which leads through a filter 50 and pump 51 to an inlet pipe 52 operatively connected to the nozzles 46. Also, any excess fluid which may result from the operation of the apparatus may be drained from the tray 42 into a storage container 53 through the line 54.

Means are also provided for cooling the fluid 48 to a temperature below that of the exhaust and prior to being sprayed through the nozzles 46. More particularly, the cooling means comprises a first tubular coil 58 positioned within the tray 42 so as to be completely immersed in the fluid 48, a second tubular coil 60 forming a part of the heat exchanger 24 in the inlet duct system 22, and a pair of tubular members 62 and 63 interconnecting the first and second coils to form a closed tubular loop. A pump 64 is provided for circulating a heat transfer medium, such as water, through the loop (which as illustrated also includes the coil 58 in the second apparatus 30), and such that the heat absorbed from the fluid 48 by the first coil 58 is transferred to the second coil 60 where it acts to preheat the air entering the tenter frame oven.

A relief tank 66 for the cooling system is positioned at an elevation above the tenter frame enclosure 14 and the remaining portions of the cooling system. The tank 66 is designed to automatically maintain water within the loop of the cooling system, and also permit release of the water from the loop in the event of an undue pressure buildup therein. For this purpose, the tank 66 includes a float operated valve 67 for controlling the inlet of water to maintain a predetermined water level therein, and a line 68 for conveying any overflow to a drain.

Figure 4:
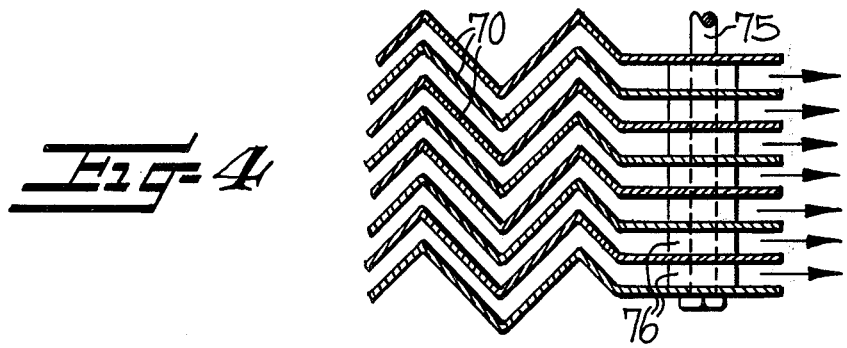
FIG. 4 is a fragmentary plan view of a portion of the precipitator of the apparatus.
Figure 5:
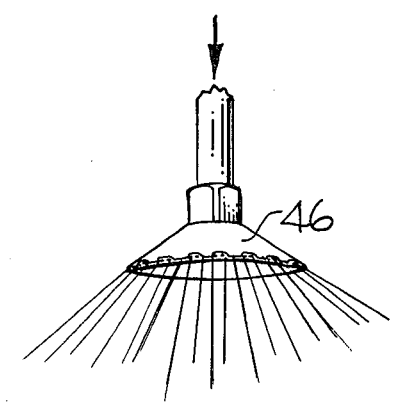
FIG. 5 is a fragmentary perspective view of a nozzle employed with the present invention.

The precipitator 40 comprises a plurality of parallel, laterally spaced apart eliminator plates 70, with the plates 70 each lying in a generally vertical plane which is parallel to the direction of air flow therethrough. Each plate has a herringbone configuration in vertical cross section (note FIG. 4), with the herringbone configuration of adjacent plates being aligned so as to define a plurality of parallel, non-linear passageways therebetween. Typically, the plates 70 comprise twenty eight gauge aluminum or similar metal, with a spacing of about one quarter inch between adjacent plates. Also, the housing 32 includes an opening 72 with a removable cover plate 73 above the precipitator 40, to permit the removal and servicing thereof. In this regard, the plates 70 are interconnected by four rods 75 having washer-like spacers 76 between the plates, and the precipitator 40 is otherwise unconnected to the housing to thereby facilitate its removal through the opening 72.

In the illustrated embodiment, two like apparatus 30 are positioned in series in the exhaust duct 28. This arrangement permits selective operation of only one apparatus 30 under average exhaust gas conditions, or both apparatus where the exhaust is exceedingly hot or contaminated. Also, a supplemental precipitator 78 in the form of a conventional electrostatic precipitator may be positioned downstream of the two apparatus 30 to further increase the percentage of the contaminants removed from the exhaust. As well known in the art, an electrostatic precipitator has provision for establishing an electrostatic field to charge the particles of atomized fluid and condensed contaminants, and oppositely charged collection plates for subsequently precipitating the charged particles thereonto. Under certain operating conditions, the electrostatic precipitator may be utilized as a substitute for the precipitator 40, thereby permitting the precipitator 40 of each apparatus 30 to be eliminated.

It is generally preferable to maintain a slight vacuum in the tenter frame and thereby minimize the release of the exhaust gases through the inlet and outlet openings in the tenter frame. For this purpose, two blowers 80 and 81 are positioned in the exhaust duct system 28. As will be apparent, the number and size of the various blowers will vary depending upon operating conditions.

In operation, the exhaust gas from the tenter frame enclosure 14, which will have a temperature of at least about 200° F., is conveyed by the two blowers 80, 81 through the two heat and smoke recovery apparatus 30 and the electrostatic precipitator 78 to the smokestack 29. The fluid 48 in the tray 42 of each apparatus 30 is continuously circulated by the pump 51 through the filter 50 to remove any particulate matter, and then to the nozzles 46 where it is delivered in a finely atomized spray into the passageway through the housing 32. The fluid spray falls vertically through the housing and comes into intimate contact with the exhaust passing therethrough. In this regard, the fact that the exhaust rises somewhat as it passes through the housing results in the atomized spray having a directional component which is opposed to the direction of the airstream. It is believed that this orientation serves to facilitate heat transfer between the airstream and fluid.

The fluid sprayed into the housing 32 has a temperature substantially below that of the exhaust (typically 70° F. below that of the exhaust), and thus the fluid 48 absorbs heat from and cools the exhaust. Also, a substantial portion of the volatilized contaminants in the exhaust will thereby be condensed and fall with the sprayed fluid into the tray 42. The water passing through the coils 58 in the tray acts to cool the collected fluid and condensed contaminants to the degree required to obtain the desired temperature for the fluid when it is sprayed into the housing. The water then carries the heat collected from the fluid and condensed contaminants to the coils 60 of the heat exchanger 24, where it is imparted to the air entering the tenter frame.

The amount of heat recovered from the airstream depends upon a number of factors, including the volume of fluid being sprayed into the housing and the temperature of the fluid. Generally, it is desirable that the quantity of the fluid sprayed into the housing and the temperature of the fluid are such as to lower the temperature of the airstream by about one half the difference between the original exhaust temperature and ambient temperature. In one installation wherein the exhaust from a tenter frame has a temperature of about 195° F. and a volume flow rate of about 7000 cfm, a temperature reduction to about 135° F. was achieved using a sprayed fluid cooled to a temperature of about 115° F. and sprayed at a volume of about 38 gallons per minute into the housing.

The downstream precipitator 40 acts to remove a further proportion of the condensed contaminants from the exhaust. More particularly, the passage of the exhaust through the non-linear passageways of the eliminator plates 70 results in the condensed contaminants being precipitated onto the surfaces of the plates. The fluid then falls from the plates 70 onto the inclined surface of the wall 43 and is conveyed by gravity through the slot 44 and into the tray 42.

Upon start-up of the apparatus 30, the tray 42 is initially filled with a suitable fluid, such as lightweight mineral oil of a type similar to that used as a textile lubricating oil. During operation, the condensed contaminants, which typically largely comprise oil of similar properties, add to the fluid supply. The resulting excess may be drained through the line 54 so that it may be reclaimed and used for separate purposes.

In the drawings and specification, there has been set forth a preferred embodiment of the invention, and although specific terms are employed, they are used in a generic and descriptive sense only and not for purposes of limitation.

That which is claimed is:

1. A method of recovering heat and removing volatilized contaminant from an airstream which has a temperature near or above the boiling temperature of water, and comprising the continuous and simultaneous steps of spraying into the airstream a liquid contaminant which has been previously collected and condensed from the airstream, with the amount and temperature of the sprayed liquid contaminant being such as to reduce the temperature of the airstream to a point substantially below the boiling temperature of water and to condense at least a substantial portion of the volatilized contaminant in the airstream, collecting the sprayed liquid contaminant and the additional condensed liquid contaminant, cooling at least a portion of the collected liquid contaminant, and including recovering the removed heat to permit the separate use thereof, and circulating at least a portion of the collected and cooled liquid contaminant to make up the liquid contaminant which is sprayed into the airstream in the previously recited spraying step.

2. The method as defined in claim 1 wherein the liquid contaminant which is sprayed into the airstream has a boiling temperature substantially corresponding to that of lightweight oil.

3. The method as defined in claim 2 wherein the amount and temperature of the circulated liquid contaminant which is sprayed into the airstream are sufficient to lower the temperature of the airstream by about one half the difference between the original temperature of the airstream and ambient temperature.

4. The method as defined in claim 2 wherein the step of collecting the sprayed liquid contaminant and condensed liquid contaminant includes passing the airstream through a plurality of parallel, non-linear passageways to precipitate the liquid contaminant onto the walls of the passageways.

5. The method as defined in claim 2 wherein the step of collecting the sprayed liquid contaminant and condensed liquid contaminant includes passing the airstream through an electrostatic field to charge the particles of the contaminant, and then passing the airstream past an oppositely charged collection plate to cause the contaminant to precipitate onto the collection plate.

6. The method as defined in claim 2 wherein the step of circulating the contaminant includes filtering the same to remove particulate matter therefrom.

7. The method as defined in claim 2 wherein the spraying step includes spraying the liquid contaminant in a direction which has at least a component which is opposed to the direction of the airstream to thereby facilitate heat transfer between the airstream and liquid contaminant.

8. The method as defined in claim 2 comprising the further step of draining off any excess of the collected liquid contaminant to permit the separate use thereof.

9. The method as defined in claim 1 wherein the spraying step includes spraying the liquid contaminant into the airstream so that the liquid contaminant is free of contact with any packing media during its contact with the airstream.

10. An apparatus for recovering heat and removing volatilized fluid contaminants from an airstream, and comprising a housing having an air passageway therethrough and which is adapted to form a part of an air duct system, a liquid collection tray positioned within said housing, a liquid having a boiling temperature substantially corresponding to that of lightweight oil substantially filling said tray, liquid inlet means positioned in said housing and generally above said tray for introducing an atomized liquid into the housing and such that the air passageway extends between said liquid inlet means and said tray, means for circulating said liquid from said collection tray and into the housing through said inlet means, such that the air passing through said passageway comes into intimate contact with the atomized liquid, means for cooling said liquid to a temperature below that of the airstream and prior to being circulated through said inlet means, such that the circulating liquid acts to absorb heat from the airstream and condense at least a portion of any volatilized contaminants therein, and means positioned downstream of said liquid inlet means and tray for precipitating at least a substantial portion of any contaminants remaining in the airstrem, and comprising means for imparting an electrostatic field to the airstream to charge the contaminants therein, and for collecting the charged contaminants.

11. An apparatus useful in the heat treatment of textile fabrics or the like, and characterized by the efficient use of heat energy and the recovery of a substantial portion of any volatilized fluid contaminants in the exhaust, and comprising an oven having provision for heating a textile fabric or the like to a temperature of between about 450–500 degrees F., inlet duct means operatively connected to said oven for introducing air thereinto, exhaust duct means operatively connected to said oven for conveying away the exhaust gases, a housing having an air passageway therethrough and operatively connected to said exhaust duct means, a liquid collection tray positioned within said housing, a liquid having a boiling temperature substantially corresponding to that of lightweight oil substantially filling said tray, nozzle means positioned in said housing and generally above said tray for introducing an atomized liquid into the housing, and such that the air passageway extends between said nozzle means and said tray, means for circulating said liquid from the collection tray and into the housing through said nozzle means, such that the exhaust passing through said exhaust duct means and said housing comes into intimate contact with the atomized liquid, and means for cooling the circulating liquid to a temperature below that of the exhaust and prior to being circulated through said nozzle means, such that the liquid acts to absorb heat from the airstream and condense at least a portion of any volatilized contaminants therein.

12. The apparatus as defined in claim 11 wherein said means for cooling the circulating fluid includes means for transferring the removed heat energy to said inlet duct means to preheat the air entering said oven.

13. The apparatus as defined in claim 11 wherein said circulating means includes a filter for removing particulate matter from said fluid.

14. The apparatus as defined in claim 11 wherein said nozzle means comprises a plurality of spaced apart spray nozzles.

15. The apparatus as defined in claim 11 further comprising means downstream of said nozzle means and tray for precipitating at least a substantial portion of any condensed contaminants remaining in the airstream.

16. The apparatus as defined in claim 15 wherein said precipitating means comprises a plurality of parallel, laterally spaced apart plates, said plates each lying in a generally vertical plane which is parallel to the direction of air flow through said passageway, and with each of said plates having a herringbone cross-sectional configuration with the herringbone configuration of adjacent plates being aligned so as to define a plurality of parallel, non-linear passageways therebetween.

17. The apparatus as defined in claim 15 wherein said precipitating means comprises means for imparting an electrostatic field to the airstream to charge the condensed contaminants therein, and for collecting the charged contaminants.

18. The apparatus as defined in claim 11 or 10 wherein said air passageway through said housing is open and characterized by the absence of any packing media therein.

* * * * *